United States Patent
Lapujade (10) Patent No.: US 10,997,831 B2
(45) Date of Patent: May 4, 2021

(54) EXIT DOOR INDICATION SYSTEM

(71) Applicant: GOODRICH LIGHTING SYSTEMS, INC., Oldsmar, FL (US)

(72) Inventor: Philippe Lapujade, Chandler, AZ (US)

(73) Assignee: Goodrich Lighting Systems, Inc., Oldsmar, FL (US)

( * ) Notice: Subject to any disclaimer, the term of this patent is extended or adjusted under 35 U.S.C. 154(b) by 0 days.

(21) Appl. No.: 16/056,356

(22) Filed: Aug. 6, 2018

(65) Prior Publication Data

US 2020/0043307 A1 Feb. 6, 2020

(51) Int. Cl.
*B64D 45/00* (2006.01)
*G08B 7/06* (2006.01)
*B64D 11/00* (2006.01)
*G09F 13/04* (2006.01)

(52) U.S. Cl.
CPC ............ *G08B 7/062* (2013.01); *B64D 45/00* (2013.01); *G08B 7/066* (2013.01); *B64D 2011/0038* (2013.01); *B64D 2045/007* (2013.01); *G09F 2013/0459* (2013.01)

(58) Field of Classification Search
CPC .................................................. G08B 7/066
See application file for complete search history.

(56) References Cited

U.S. PATENT DOCUMENTS

| | | | |
|---|---|---|---|
| 4,029,994 A * | 6/1977 | Iwans | H05B 37/029 315/132 |
| 4,347,499 A | 8/1982 | Burkman, Sr. | |
| 6,249,221 B1 * | 6/2001 | Reed | G08B 1/08 340/286.05 |
| 6,928,213 B2 | 8/2005 | Neuberger | |
| 7,255,454 B2 | 8/2007 | Peterson | |
| 9,595,845 B2 * | 3/2017 | McBryde | H02J 9/02 |
| 9,928,761 B2 | 3/2018 | Palanisamy et al. | |
| 2007/0146115 A1 * | 6/2007 | Roosli | E05B 47/00 340/5.6 |
| 2007/0152808 A1 * | 7/2007 | LaCasse | G08B 7/062 340/524 |

(Continued)

FOREIGN PATENT DOCUMENTS

| | | |
|---|---|---|
| FR | 2838402 | 10/2003 |
| GB | 2199176 | 6/1988 |
| JP | S61166692 | 7/1986 |

OTHER PUBLICATIONS

European Patent Office, European Search Report dated Dec. 2, 2019 in Application No. 19189344.5.

*Primary Examiner* — Joseph H Feild
*Assistant Examiner* — Pameshanand Mahase
(74) *Attorney, Agent, or Firm* — Snell & Wilmer L.L.P.

(57) ABSTRACT

An aircraft emergency exit door indication system may comprise a first plurality of light sources, a controller, and a first sensor associated with a first exit door. The first sensor feedback signal indicates an availability for egress through the first exit door. The first plurality of light sources is operated by the controller based upon the first sensor feedback signal. The light sources may be lights that already exist in an aircraft such as ceiling wash lights, sidewall wash lights, floor path lights, dome lights, or passenger service unit lights. The system may include a second plurality of light sources logically separated from the first plurality of light sources based upon its location relative to the first exit door and a second exit door.

17 Claims, 6 Drawing Sheets

(56) References Cited

U.S. PATENT DOCUMENTS

| | | |
|---|---|---|
| 2010/0013658 A1 | 1/2010 | Chen |
| 2016/0003428 A1* | 1/2016 | Anderson ............... F21S 8/033 |
| | | 362/147 |
| 2016/0027266 A1 | 1/2016 | McDonagh |
| 2016/0042615 A1* | 2/2016 | Turner .................... G08B 5/38 |
| | | 340/815.66 |
| 2018/0063912 A1* | 3/2018 | Ueno ................ H05B 33/0842 |

* cited by examiner

EXIT DOOR INDICATION SYSTEM

FIELD

The present disclosure relates generally to emergency guidance systems, and more specifically to aircraft emergency exit door guidance systems.

BACKGROUND

In many situations and environments, it is desirable to provide emergency systems that direct persons to exits or other areas of safety. Areas such as airplanes may require systems to direct persons in the event of an emergency. It may be desirable for such systems to have certain characteristics to be effective. They should be highly visible, both in darkness and in situations where smoke or other environmental conditions reduce visibility. They should be able to communicate escape routes effectively and unambiguously to users. Finally, they should be able to guide persons to the most accessible exit in the vicinity of the persons.

The current method for identification of exit areas include static signs and phosphorescent floor marking. During an emergency event, confusion and panic may occur and instructions given by the flight crew relative to location of emergency exits may be forgotten or misinterpreted.

SUMMARY

An aircraft emergency exit door indication system is disclosed, comprising a first plurality of light sources, a controller in electronic communication with the first plurality of light sources, a first sensor associated with a first exit door, wherein the controller receives a first sensor feedback signal from the first sensor indicating an availability for egress through the first exit door, and the first plurality of light sources is operated by the controller based upon the first sensor feedback signal.

In various embodiments, the first plurality of light sources include at least one of a ceiling wash light, a sidewall wash light, a floor path light, a dome light, or a passenger service unit light.

In various embodiments, the aircraft emergency exit door indication system may further comprise a second plurality of light sources, the controller in electronic communication with the second plurality of light sources, and a second sensor associated with a second exit door, wherein the first plurality of light sources is logically separated from the second plurality of light sources based upon its location relative to the first exit door and the second exit door, the controller receives a second sensor feedback signal from the second sensor indicating an availability for egress through the second exit door, and the second plurality of light sources is operated by the controller based upon the second sensor feedback signal.

In various embodiments, at least one of the first plurality of light sources and the second plurality of light sources is sequentially pulsed to provide a travelling light path towards at least one of the first exit door and the second exit door based upon at least one of the availability for egress through the first exit door and the availability for egress through the second exit door.

In various embodiments, the first plurality of light sources is disposed along a longitudinal axis of an aisle for indicating a first direction of egress parallel to the longitudinal axis.

In various embodiments, the second plurality of light sources is disposed along a longitudinal axis of an aisle for indicating a second direction of egress parallel to the longitudinal axis.

In various embodiments, the aircraft emergency exit door indication system further comprises a power supply, and a power electronics configured to transmit an electric power from the power supply to at least one of the first plurality of light sources and the second plurality of light sources.

An aircraft passenger compartment is disclosed, comprising an aisle extending along a longitudinal axis, a first exit door, a first sensor associated with the first exit door, a first plurality of light sources disposed along the longitudinal axis, a controller in electronic communication with the first plurality of light sources and the first sensor;
wherein the controller receives a first sensor feedback signal from the first sensor indicating an availability for egress through the first exit door, the first plurality of light sources is operated by the controller based upon the first sensor feedback signal.

In various embodiments, the first plurality of light sources include at least one of a ceiling wash light, a sidewall wash light, a floor path light, a dome light, or a passenger service unit light.

In various embodiments, the first plurality of light sources and are sequentially pulsed to provide a travelling light path towards the first exit door based upon the availability for egress through the first exit door.

In various embodiments, the aircraft passenger compartment may further comprise a second exit door, a second sensor associated with the second exit door, a second plurality of light sources disposed along the longitudinal axis, wherein the controller is in electronic communication with the second plurality of light sources and the second sensor, wherein the first plurality of light sources is logically separated from the second plurality of light sources based upon its location relative to the first exit door and the second exit door.

In various embodiments, the controller receives a second sensor feedback signal from the second sensor indicating an availability for egress through the second exit door.

In various embodiments, the second plurality of light sources is operated by the controller based upon the second sensor feedback signal.

In various embodiments, the controller is configured to command the first plurality of light sources to switch from emitting a first light comprising a first color to a second light comprising a second color.

In various embodiments, the aircraft passenger compartment may further comprise a power supply, and a power electronics configured to transmit an electric power from the power supply to the first plurality of light sources.

A method for operating an aircraft emergency exit door indication system is disclosed, comprising receiving, by a controller, a first sensor feedback signal from a first sensor associated with a first exit door, and operating, by the controller, a first plurality of light sources based upon the first sensor feedback signal, wherein the first sensor feedback signal indicates an availability for egress through the first exit door.

In various embodiments, the method further comprises receiving, by the controller, a second sensor feedback signal from a second sensor associated with a second exit door.

In various embodiments, the method further comprises operating, by the controller, a second plurality of light sources based upon the second sensor feedback signal, wherein the first plurality of light sources is logically separated from the second plurality of light sources based upon its location relative to the first exit door and the second exit door.

In various embodiments, operating the first plurality of light sources includes commanding the first plurality of light sources to switch from emitting a first light comprising a first color to a second light comprising a second color.

In various embodiments, operating the first plurality of light sources causes the first plurality of light sources to sequentially pulse to provide a travelling light path towards the first exit door based upon at least one of the availability for egress through the first exit door.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation. Throughout the present disclosure, like reference numbers denote like elements. Accordingly, elements with like element numbering may be shown in the figures but may not be necessarily be repeated herein for the sake of clarity.

A system of the type contemplated by the present disclosure includes an optical portion and a control portion actively interconnected. While particular sensing devices are utilized at each of the exits to indicate the availability of a particular exit, it should be understood that the broad term "sensing devices" is meant to encompass a broad variety of devices such as impact switches, pressure sensing devices, temperature sensing devices, smoke or particulate suspension sensing devices, as well as simple switch devices which indicate an inability to operate a given hatch or exit door. Contemplated sensors include semiconductor-based sensors, piezoelectric sensors, thermocouples, resistance temperature detectors (RTDs), negative temperature coefficient (NTC) thermistors, ionization sensors, and photoelectric sensors, among others. Contemplated switches include mechanical switches and electronic switches, such as transistors, thyristors, diodes, pressure switches, and temperature switches, among others. Other forms of sensors are contemplated as being included since their input is all that is required for operation of this system.

Figure 1:
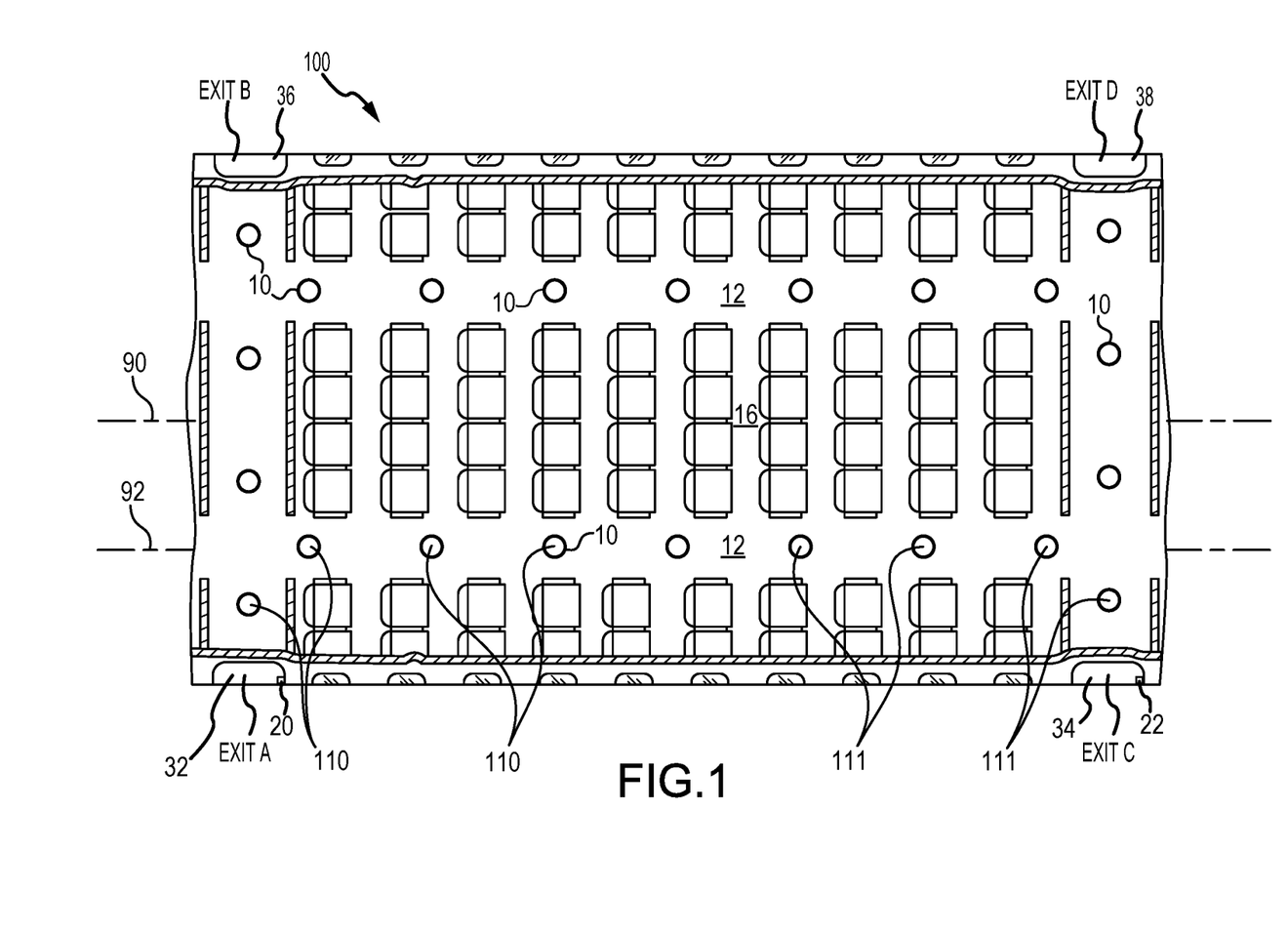
FIG. 1 illustrates a cut-away plan view of an aircraft passenger compartment generally showing an emergency exit lighting system, in accordance with various embodiments.

With reference to FIG. 1, an emergency exit lighting system 100 being utilized in an aircraft passenger compartment, is generally shown in the cut-away plan view of FIG. 1, in accordance with various embodiments. A plurality of light sources 10 are illustrated generally in FIG. 1 and, as will become more clear with the accompanying figures and description, the light sources 10 may be of various forms and disposed in various locations throughout the aircraft depending on the desired implementation of the system. The light sources 10 may be chosen from any of the existing light sources available in the aircraft passenger cabin 16, including ceiling wash lights, sidewall wash lights, floor path lights, dome lights, or any of the passenger service unit lights (e.g., row number lighting, reading lights, seat belt lighting, Wi-Fi lighting, call attendant lighting, no smoking lighting, etc.), or any other suitable light source existing in the aircraft passenger compartment. In this regard, FIG. 1 is meant to show the general locations of light sources 10 relative to emergency exits in order to illustrate the functionality of the light sources 10 with respect to one or more aircraft exits (e.g., exit A, exit B, exit C, and exit D) and is not meant to limit the locations of the light sources 10 within the aircraft passenger compartment.

The stylized cabin of FIG. 1 illustrates a pair of aisles 12 running parallel to the axis 90 of the fuselage and are defined at the ends of each passenger compartment by a transverse wall and passageway leading to particular exits. Spaced light sources 10 are located in each aisle 12 as well as in the transversely disposed passageways, the term aisle and passageway may be used interchangeably for purposes of description since they are also applicable to stationary structures where the function of this system is also applicable.

The light sources 10 may be disposed along the axis of such aisles. By disposing light sources 10 along the axis of the aisles, the displayed pattern generated by sequentially pulsing the light sources 10 provides a travelling light path directing particular passengers seated adjacent a particular aisle to an appropriate available exit. This directional control of the passengers may be desirable for rapid evacuation as well as preventing overcrowding at an exit that is unavailable for a reason that has been detected by at least one of the sensors.

In various embodiments, the light sources 10 may be formed as continuous strips of light emitting diodes (LEDs), for example if the light sources 10 are implemented using floor path lights or wash lights. In various embodiments, the light sources 10 may be formed as discrete bulbs, for example if the light sources 10 are implemented using dome lights or any of the passenger service unit lights. In response to an emergency event, the light sources 10 may operate to clearly delineate moving or sequentially pulsed lights in a desired direction of travel. The intensity of the light source may be dependent upon the environment and the most commonly anticipated conditions that will exist in the case of an emergency. Furthermore, the color of the lighting may be changed in response to an emergency event. For example, LED wash lights which might typically be a first color such as purple or blue during normal operation of the aircraft may be changed to a second color such as red or orange in response to the light sources 10 being operated under an emergency evacuation mode. As a further example, the color of LED light sources 10 may be changed to indicate desirable and undesirable routes of egress, for example a first color such as green to indicate a properly functioning exit and a second color such as red to indicate a dysfunctional emergency exit.

Figure 2:
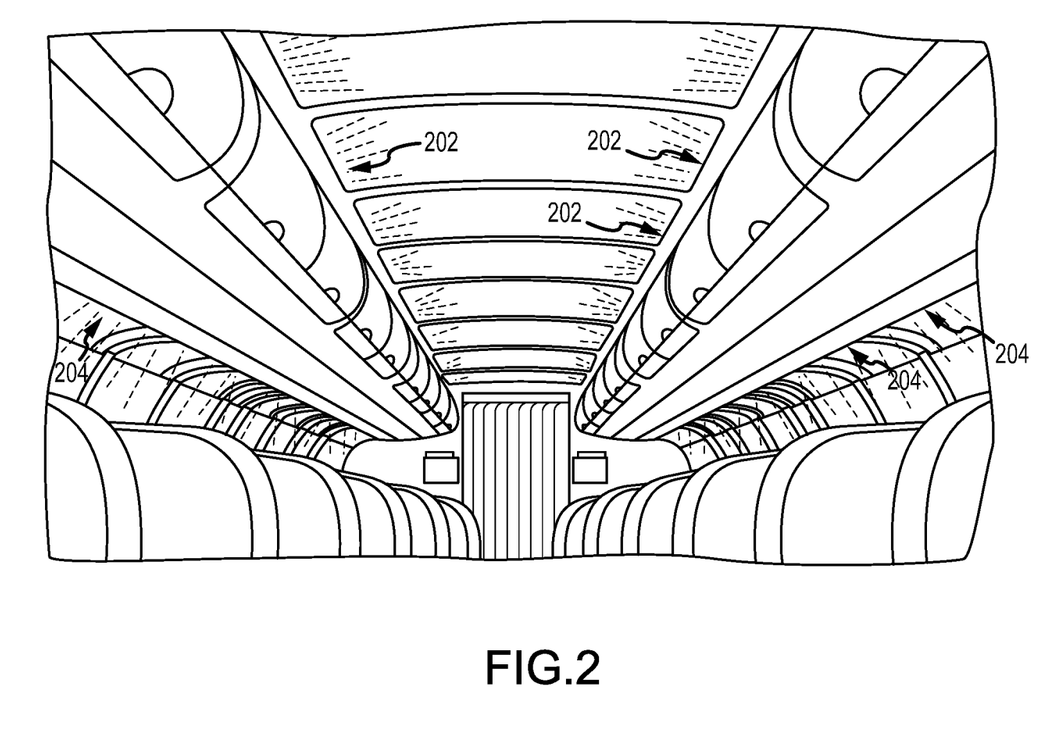
FIG. 2 is a perspective view of ceiling wash lights and sidewall wash lights for an aircraft passenger cabin, in accordance with various embodiments.

With reference to FIG. 2, an exemplary aircraft passenger cabin is illustrated having ceiling wash lights 202 and sidewall wash lights 204. In various embodiments, light sources 10 of FIG. 1 may be similar to ceiling wash lights 202. In various embodiments, light sources 10 of FIG. 1 may be similar to sidewall wash lights 204. In various embodiments, ceiling wash lights 202 and/or sidewall wash lights 204 may comprise LEDs.

Figure 3:
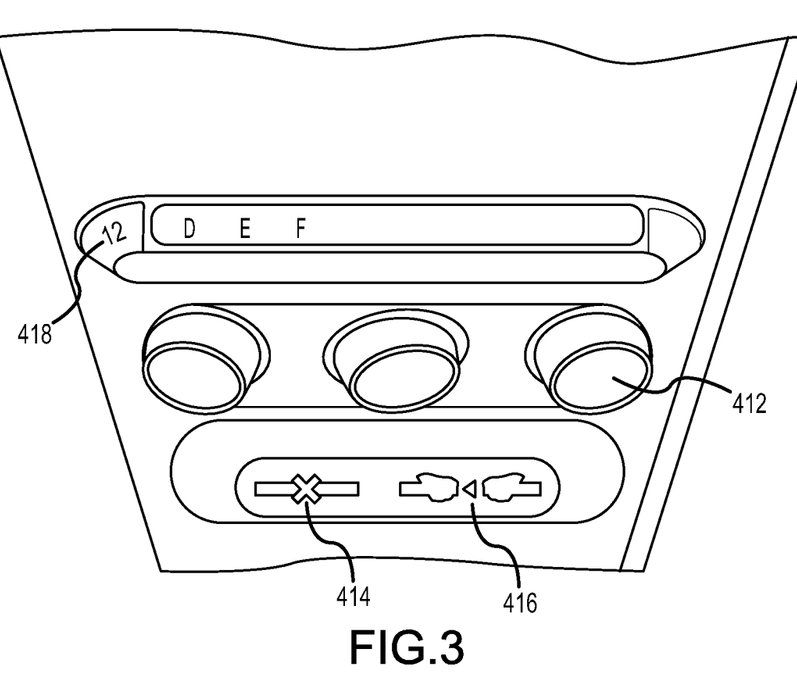
FIG. 3 is a perspective view of passenger service unit lights for an aircraft passenger cabin, in accordance with various embodiments.

With reference to FIG. 3, exemplary passenger service unit lights including reading light 412, no smoking light 414, fasten seatbelt light 416, and row indication light 418 is illustrated in accordance with various embodiments. In various embodiments, light sources 10 of FIG. 1 may be similar to reading light 412. In various embodiments, light sources 10 of FIG. 1 may be similar to no smoking light 414. In various embodiments, light sources 10 of FIG. 1 may be similar to fasten seatbelt light 416. In various embodiments, light sources 10 of FIG. 1 may be similar to row indication light 418.

Figure 4:
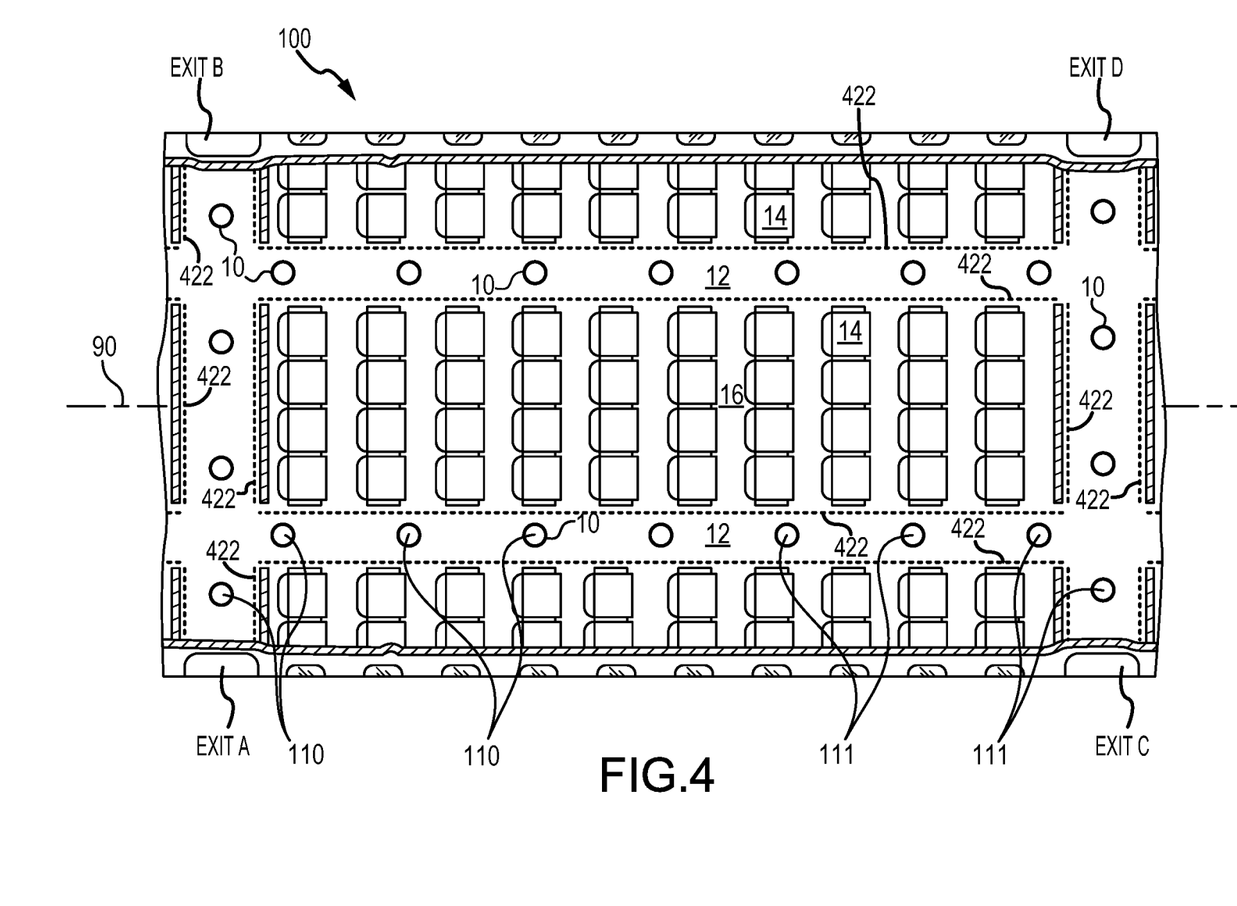
FIG. 4 illustrates a cut-away plan view of an aircraft passenger compartment schematically showing floor path lights, in accordance with various embodiments.

With reference to FIG. 4, a schematic view of a passenger cabin 16 having floor path lights 422 for illuminating the floor of the passenger cabin 16 is illustrated, in accordance with various embodiments. Floor path lights 422 may be disposed in the floor of passenger cabin 16. Floor path lights 422 may be disposed in the aisle seats 14 of passenger cabin 16. In various embodiments, light sources 10 of FIG. 1 may be similar to floor path lights 422.

Figure 5:
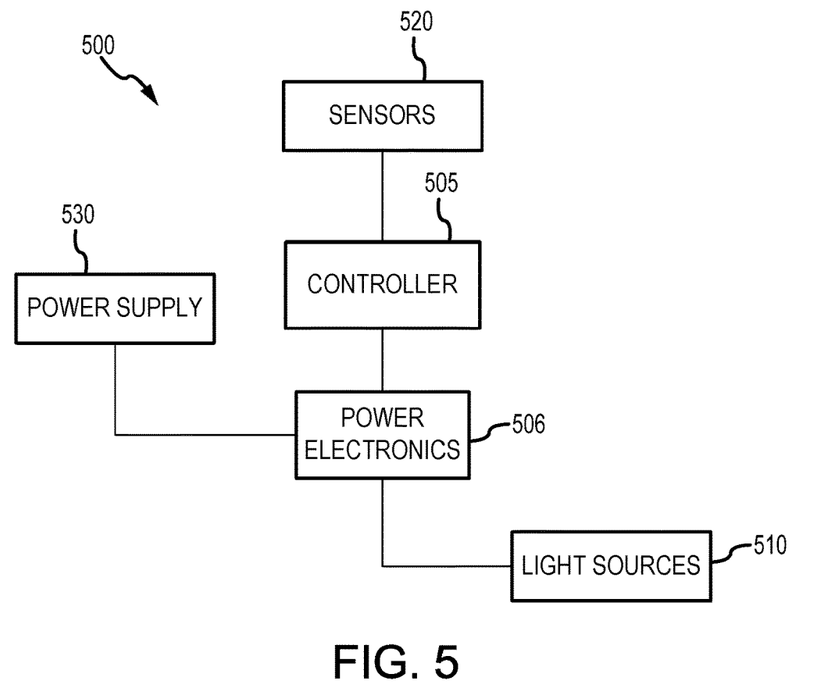
FIG. 5 is a schematic view of an aircraft emergency exit door indication system, in accordance with various embodiments.

With reference to FIG. 5, a schematic view of an aircraft emergency exit door indication system (system) 500 is illustrated, in accordance with various embodiments. System 600 includes controller 505 and power electronics 506 in electronic communication with light sources 510. In various embodiments, light sources 10 of FIG. 1 may be similar to light sources 510. In various embodiments, the controller 505 includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the controller 505 controls, at least various parts of, the illumination of, and operation of various components of, the light sources 510. For example, the controller 505 controls various parameters of light sources 510, such as power, strobing, color, and the like. In this regard, power electronics 506 includes suitable power electronics for conditioning electric power received from power supply 530 for light sources 510, such as power converters, switches, etc.

In various embodiments, controller 505 is in electronic communication with sensors 520. Sensors 520 may be disposed at the exits of an aircraft passenger compartment. The sensors 520 may comprise any suitable sensor for detecting an emergency exit being unsuitable for egress. For example, pressure sensors may be used to detect that an inflatable (e.g., slide or raft) associated with an exit has properly deployed, temperature sensors may be used for detecting elevated temperatures at an exit that may make the exit unsuitable for egress, or any other type of sensor may be used for detecting any condition that may indicate that an emergency exit is unsuitable for egress, such as smoke, fire, congestion, a faulty latch, or a faulty inflatable, among others.

Controller 505 may use a sensor signal (e.g., a current signal or a voltage signal) from sensors 520 to determine if the exits associated with each of the sensors 520 are suitable for egress. In response to controller 505 determining that an exit associated with a sensor 520 is unsuitable for egress, controller 505 may vary the illumination of light sources 510 to indicate the exit is unsuitable for egress. For example, controller 505 may command light sources 510 to direct passengers to another exit that is suitable for egress. Conversely, in response to controller 505 determining that an exit associated with a sensor 520 is suitable for egress, controller 505 may vary the illumination of light sources 510 to indicate the exit is suitable for egress. For example, controller 505 may command light sources 510 to direct passengers to the exit.

Figure 6:
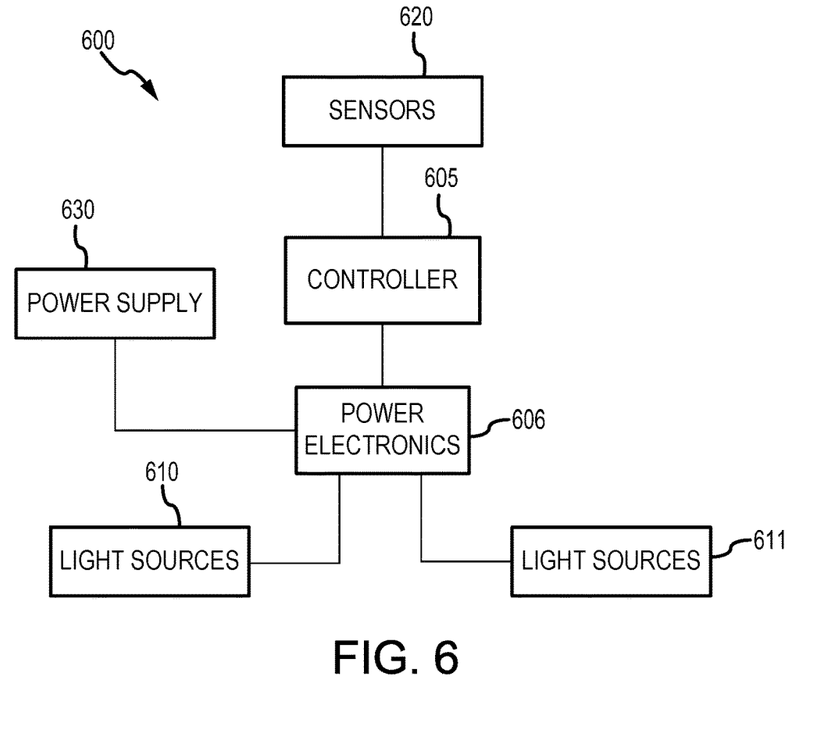
FIG. 6 is a schematic view of an aircraft emergency exit door indication system having logically separated light sources, in accordance with various embodiments.

With reference to FIG. 6, a schematic view of an aircraft emergency exit door indication system (system) 600 is illustrated, in accordance with various embodiments. System 600 includes controller 605 and power electronics 606 in electronic communication with light sources 610 and light sources 611. Controller 605 is further in electronic communication with sensors 620. Power electronics 606 transmits electric power from power supply 630 to light sources 610 and/or light sources 611. In this regard, system 600 may be similar to system 500 of FIG. 5 except that the light sources of system 600 are logically divided based upon their location relative to one or more exits. In this manner, light sources 610 may be configured to direct passengers toward an exit associated with the light sources 610 in response to feedback from one of the sensors 620 indicating that the exit is suitable for egress. Furthermore, light sources 610 may be configured to direct passengers away from the exit in response to feedback from one of the sensors 620 indicating that the exit is unsuitable for egress. Light sources 611 may similarly be operated based upon the suitability for egress of an exit associated with light sources 611.

For example, with combined reference to FIG. 1 and FIG. 6, a first plurality of light sources 110 may be disposed along a longitudinal axis 92 of aisle 12. A second plurality of light sources 111 may be disposed along the longitudinal axis 92 of aisle 12. A first sensor 20 associated with a first exit door 32 may send a sensor feedback signal indicating the availability for egress through first exit door 32 to a controller (e.g., controller 605). In response to the sensor feedback signal indicating that first exit door 32 is available for egress, controller 605 may operate the first plurality of light sources 110 to be sequentially pulsed to provide a travelling light path towards the first exit door 32. In response to the sensor feedback signal indicating that first exit door 32 is unavailable for egress, controller 605 may operate the first plurality of light sources 110 to be sequentially pulsed to provide a travelling light path away from the first exit door 32 and towards an adjacent exit door, such as second exit door 34 or third exit door 36 for example.

Similarly, a second sensor 22 associated with second exit door 34 may send a sensor feedback signal indicating the availability for egress through exit door 34 to controller 605. In response to the sensor feedback signal indicating that exit door 34 is available for egress, controller 605 may operate the second plurality of light sources 111 to be sequentially pulsed to provide a travelling light path towards the second exit door 34. In response to the sensor feedback signal indicating that second exit door 34 is unavailable for egress, controller 605 may operate the second plurality of light source 111 to be sequentially pulsed to provide a travelling light path away from the second exit door 34 and towards an adjacent exit door, such as exit door 32 or exit door 38 for example.

Figure 7:
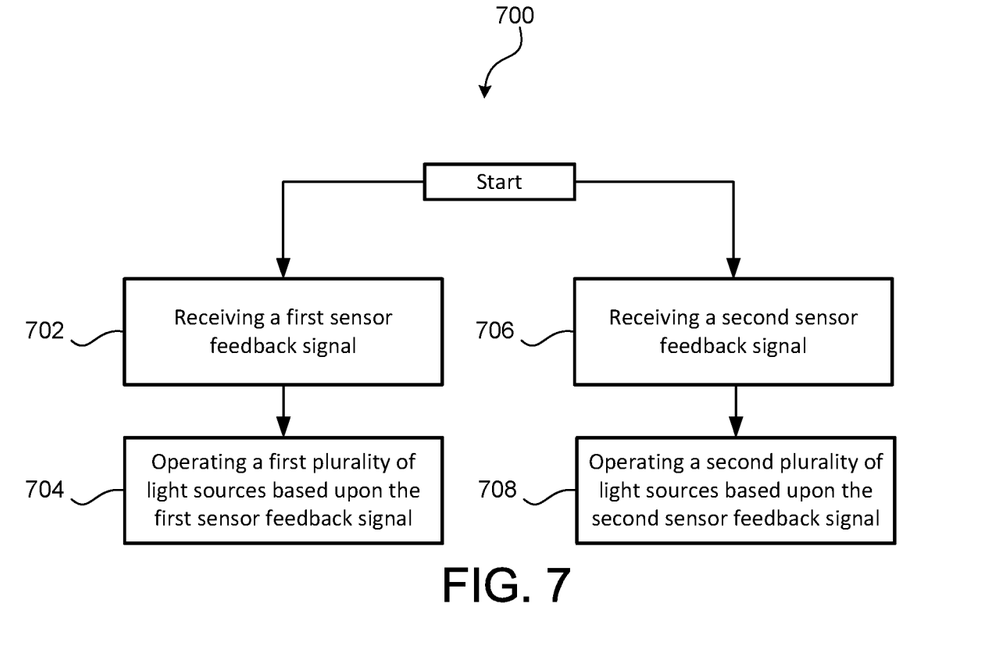
FIG. 7 is a schematic flow chart diagram of a method for operating an aircraft emergency exit door indication system, in accordance with various embodiments.

With reference to FIG. 7, a flow chart providing a method 700 for operating an aircraft emergency exit door indication system is illustrated, in accordance with various embodiments. Method 700 includes receiving a first sensor feedback signal (step 702). Method 700 includes operating a first plurality of light sources based upon the first sensor feedback signal (step 704). Method 700 may include receiving a second sensor feedback signal (step 706). Method 700 may include operating a second plurality of light sources based upon the second sensor feedback signal (step 708).

With combined reference to FIG. 6 and FIG. 7, step 702 may include receiving, by controller 605, a first sensor feedback signal from a first sensor of the sensors 620. The first sensor may be associated with a first exit door, such as first exit door 32 for example, with momentary reference to FIG. 1. Likewise, step 706 may include receiving, by controller 605, a second sensor feedback signal from a second sensor of the sensors 620. The second sensor may be associated with a second exit door, such as second exit door 34 for example, with momentary reference to FIG. 1. Step 704 may include operating light sources 610 based upon the first sensor feedback signal. For example, in response to the first sensor feedback signal indicating that the associated exit is available, light sources 610 may be operated to sequentially pulse to provide a travelling light path towards the associated exit door. In various embodiments, in response to the sensor feedback signal indicating that the associated exit is unavailable, light sources 610 may be operated to sequentially pulse to provide a travelling light path away from the associated exit door and towards an adjacent available exit door (e.g., towards a second exit door). Step 708 may include operating light sources 611 based upon the second sensor feedback signal. For example, in response to the second sensor feedback signal indicating that the associated exit is available, light sources 611 may be operated to sequentially pulse to provide a travelling light path towards the associated exit door. In various embodiments, in response to the sensor feedback signal indicating that the associated exit is unavailable, light sources 611 may be operated to sequentially pulse to provide a travelling light path away from the associated exit door and towards an adjacent available exit door (e.g., towards the first exit door).

In various embodiments, with reference to FIG. 2, in response to an emergency event, ceiling wash lights 202 may turn a color indicating an emergency event, such as yellow for example, and sidewall wash lights may be sequentially pulsed to provide a travelling light path towards the nearest available exit. In response to an exit being determined unavailable for egress, lights near that exit (e.g., ceiling wash lights 202 near said unavailable exit) may turn a color indicating the unavailability for egress, such as red for example, or the lights may be dimmed to indicate said unavailability. In response to an exit being determined available for egress, lights near that exit (e.g., ceiling wash lights 202 near said available exit) may turn a color indicating the availability for egress, such as green for example.

In various embodiments, with combined reference to FIG. 2 and FIG. 4, in response to an emergency event, various types of lights may work in concert to direct passengers to an appropriate egress. For example, floor path lights 422 and sidewall wash lights 204 may be sequentially pulsed to provide a travelling light path towards the nearest available exit, while ceiling wash lights 202 near available exits are turned green and ceiling wash lights 202 near unavailable exits are turned red. However, any suitable existing light sources may be used, alone or in combination with other light sources, for the aircraft emergency exit door indication system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft emergency exit door indication system, comprising:
    a first plurality of light sources;
    a second plurality of light sources;
    a controller in electronic communication with the first plurality of light sources and the second plurality of light sources;
    a first sensor associated with a first exit door;
    wherein the controller receives a first sensor feedback signal from the first sensor indicating an availability for egress through the first exit door;
    the first plurality of light sources and the second plurality of light sources are is operated by the controller based upon the first sensor feedback signal to indicate a direction of egress with respect to the first exit door, wherein, in response to being operated by the controller;
    the first plurality of light sources changes from emitting a first light comprising a first color to emitting a second light comprising a second color based upon the availability for egress through the first exit door; and
    the second plurality of light sources is sequentially pulsed to provide a travelling light path towards at least one of the first exit door and a second exit door based upon the availability for egress through the first exit door.

2. The aircraft emergency exit door indication system of claim 1, wherein the first plurality of light sources include at least one of a ceiling wash light, a sidewall wash light, a floor path light, a dome light, or a passenger service unit light; and
    the second plurality of light sources include at least one of the ceiling wash light, the sidewall wash light, the floor path light, the dome light, or the passenger service unit light.

3. The aircraft emergency exit door indication system of claim 1, further comprising:
    a second sensor associated with the second exit door;
    wherein the first plurality of light sources is logically separated from the second plurality of light sources based upon its location relative to the first exit door and the second exit door;
    the controller receives a second sensor feedback signal from the second sensor indicating an availability for egress through the second exit door; and
    the second plurality of light sources is operated by the controller based upon the second sensor feedback signal.

4. The aircraft emergency exit door indication system of claim 3, wherein the second plurality of light sources is disposed along a longitudinal axis of an aisle for indicating a second direction of egress parallel to the longitudinal axis.

5. The aircraft emergency exit door indication system of claim 3, further comprising:
    a power supply; and
    a power electronics configured to transmit an electric power from the power supply to at least one of the first plurality of light sources and the second plurality of light sources.

6. The aircraft emergency exit door indication system of claim 1, wherein the first plurality of light sources is disposed along a longitudinal axis of an aisle for indicating a first direction of egress parallel to the longitudinal axis.

7. The aircraft emergency exit door indication system of claim 1, wherein the first sensor comprises at least one of a temperature sensor, a pressure sensor, and a smoke sensor.

8. The aircraft emergency exit door indication system of claim 1, wherein the first sensor is configured to detect at least one of a fire, a smoke, a congestion, a faulty latch, and a faulty inflatable.

9. An aircraft passenger compartment, comprising:
    an aisle extending along a longitudinal axis;
    a first exit door;
    a first sensor associated with the first exit door;
    a first plurality of light sources disposed along the longitudinal axis;

a second plurality of light sources disposed along the longitudinal axis;

a controller in electronic communication with the first plurality of light sources, the first sensor, and the second plurality of light sources;

wherein the controller receives a first sensor feedback signal from the first sensor indicating an availability for egress through the first exit door;

the first plurality of light sources and the second plurality of light sources are operated by the controller based upon the first sensor feedback signal to indicate a direction of egress with respect to the first exit door, wherein, in response to being operated by the controller;

the first plurality of light sources changes from emitting a first light comprising a first color to emitting a second light comprising a second color based upon the availability for egress through the first exit door; and the second plurality of light sources is sequentially pulsed to provide a travelling light path towards at least one of the first exit door and a second exit door based upon the availability for egress through the first exit door.

10. The aircraft passenger compartment of claim 9, wherein the first plurality of light sources include at least one of a ceiling wash light, a sidewall wash light, a floor path light, a dome light, or a passenger service unit light; and the second plurality of light sources include at least one of the ceiling wash light, the sidewall wash light, the floor path light, the dome light, or the passenger service unit light.

11. The aircraft passenger compartment of claim 9, further comprising:

a second exit door;

a second sensor associated with the second exit door;

wherein the controller is in electronic communication with the second sensor;

wherein the first plurality of light sources is logically separated from the second plurality of light sources based upon its location relative to the first exit door and the second exit door.

12. The aircraft passenger compartment of claim 11, wherein the controller receives a second sensor feedback signal from the second sensor indicating an availability for egress through the second exit door.

13. The aircraft passenger compartment of claim 12, wherein the second plurality of light sources is operated by the controller based upon the second sensor feedback signal.

14. The aircraft passenger compartment of claim 9, further comprising:

a power supply; and a power electronics configured to transmit an electric power from the power supply to the first plurality of light sources.

15. A method for operating an aircraft emergency exit door indication system, comprising:

receiving, by a controller, a first sensor feedback signal from a first sensor associated with a first exit door, wherein the first sensor feedback signal indicates an availability for egress through the first exit door; and operating, by the controller, a first plurality of light sources and a second plurality of light sources based upon the first sensor feedback signal, wherein, in response to being operated by the controller:

the first plurality of light sources changes from emitting a first light comprising a first color to emitting a second light comprising a second color based upon the availability for egress through the first exit door; and the second plurality of light sources is sequentially pulsed to provide a travelling light path towards at least one of the first exit door and a second exit door based upon the availability for egress through the first exit door.

16. The method of claim 15, further comprising receiving, by the controller, a second sensor feedback signal from a second sensor associated with a second exit door.

17. The method of claim 16, further comprising operating, by the controller, the second plurality of light sources based upon the second sensor feedback signal, wherein the first plurality of light sources is logically separated from the second plurality of light sources based upon its location relative to the first exit door and the second exit door.

* * * * *